(12) United States Patent
Lea

(10) Patent No.: US 9,967,147 B2
(45) Date of Patent: May 8, 2018

(54) DYNAMIC MONITORING AND DIAGNOSIS OF WIRELESS NETWORK CONFIGURATION

(71) Applicant: ECHOSTAR TECHNOLOGIES L.L.C., Englewood, CO (US)

(72) Inventor: Mark Wayne Lea, Kennesaw, GA (US)

(73) Assignee: ECHOSTAR TECHNOLOGIES LLC, Englewood, CO (US)

(*) Notice: Subject to any disclaimer, the term of this patent is extended or adjusted under 35 U.S.C. 154(b) by 242 days.

(21) Appl. No.: 14/566,353

(22) Filed: Dec. 10, 2014

(65) Prior Publication Data
US 2016/0173337 A1 Jun. 16, 2016

(51) Int. Cl.
*H04L 12/24* (2006.01)
*H04L 12/26* (2006.01)

(52) U.S. Cl.
CPC .......... *H04L 41/12* (2013.01); *H04L 43/0811* (2013.01); *H04L 41/06* (2013.01)

(58) Field of Classification Search
CPC .................. H04L 43/0811; H04L 41/12
See application file for complete search history.

(56) References Cited

U.S. PATENT DOCUMENTS

| 9,338,747 | B1* | 5/2016 | Parthasarathy | ... H04W 52/0245 |
| 2006/0176834 | A1* | 8/2006 | Dickerson | ........ G08B 13/19656 370/260 |
| 2009/0059814 | A1* | 3/2009 | Nixon | ..................... H04L 41/12 370/254 |
| 2011/0080869 | A1* | 4/2011 | Walton | .................. H04L 45/306 370/328 |
| 2013/0286852 | A1* | 10/2013 | Bowler | ............... H04L 41/0677 370/242 |

* cited by examiner

*Primary Examiner* — Sulaiman Nooristany
(74) *Attorney, Agent, or Firm* — Lorenz & Kopf LLP

(57) ABSTRACT

Wireless networking methodologies and related apparatus are presented here. An embodiment of a wireless coordinator device is operated to monitor and control other wireless devices in a network. The coordinator device maintains a record that includes information related to a network topology and wireless connectivity of the wireless network. The coordinator device detects a change to the network topology or wireless connectivity of the wireless network, and analyzes the record to determine an event that caused the change to the network topology or wireless connectivity of the wireless network. Next, a diagnostic notification (that identifies the event) is communicated to a user or administrator of the wireless network.

18 Claims, 4 Drawing Sheets

DYNAMIC MONITORING AND DIAGNOSIS OF WIRELESS NETWORK CONFIGURATION

TECHNICAL FIELD

Embodiments of the subject matter described herein relate generally to wireless networking. More particularly, embodiments of the subject matter relate to diagnostic and troubleshooting techniques for a wireless network.

BACKGROUND

The prior art includes various wireless data communication techniques, wireless devices, and wireless network technologies. Mesh networks, ad-hoc wireless networks, and personal area networks are now used for many different applications and purposes. For example, home automation systems utilize wireless networking techniques to support data communication between a controlling device and one or more control modules (each being associated with a system, component, device, or appliance that is controlled by the home automation system). Thus, a wireless home automation system will typically include a centralized controlling device (which serves as a wireless coordinator) and a number of wireless control modules that wirelessly receive commands from the controlling device. Under normal and expected operating conditions, the controlling device can communicate with each wireless control module, either directly or indirectly. In this regard, the controlling device can indirectly communicate with a particular control module via one or more other control modules, wireless repeaters, wireless routers, or other compatible components that are capable of passing along data as needed throughout the network.

Many small-scale wireless networks are maintained in a fixed topology after deployment. In contrast, the topology or configuration of ad-hoc wireless networks and wireless home automation networks may be dynamic in nature. For example, a wireless home automation system should be flexible enough to accommodate the addition and removal of controlled devices and their corresponding wireless control modules. Unfortunately, the controlling device of a wireless home automation network could lose wireless connectivity with one or more control modules if a control module or the controlling device is physically moved away from its originally deployed position. In such a scenario, the homeowner may not realize that repositioning a component (e.g., a desk lamp, a piece of stereo equipment, or an oscillating fan) has compromised the connectivity of the home automation system.

Accordingly, it is desirable to have a system and related methodologies to dynamically monitor, diagnose, and report the status and connectivity of the wireless devices operating in a wireless network. In addition, it is desirable to have a system and related techniques to generate and communicate diagnostic notifications to a user, administrator, or manager of a wireless network in the event of a problem or loss of wireless connectivity between a controlling device and another wireless node in the network. Furthermore, other desirable features and characteristics will become apparent from the subsequent detailed description and the appended claims, taken in conjunction with the accompanying drawings and the foregoing technical field and background.

BRIEF SUMMARY

An embodiment of an apparatus is disclosed here. The apparatus includes a wireless data communication module to wirelessly communicate with a plurality of wireless devices arranged in a wireless network, an output interface to provide notifications for presentation on a device coupled to the apparatus, and a processor coupled to the wireless communication module and to the output interface. The processor detects a change to a network topology or wireless connectivity of the wireless network, determines an event that caused the change to the network topology or wireless connectivity of the wireless network, and creates a diagnostic notification that identifies the event, the output interface providing the diagnostic notification for presentation on the device.

Another embodiment of an apparatus is also disclosed here. This particular embodiment of the apparatus includes a receiver interface to receive data associated with video services, a wireless data communication module to wirelessly communicate with a plurality of wireless devices arranged in a local network, a display interface for a display element operatively coupled to the apparatus, and a processor coupled to the receiver interface and to the display interface. The display interface facilitates presentation of content on the display, wherein the content includes video content provided by the video services. The processor detects a change to a network topology or wireless connectivity of the local network, determines an event that caused the change to the network topology or wireless connectivity of the local network, and creates a diagnostic notification that identifies the event. The display interface provides the diagnostic notification for rendering on the display element.

An embodiment of a process is also disclosed here. A wireless coordinator device of a wireless network (that includes a plurality of wireless devices) maintains a record that includes information related to a network topology and wireless connectivity of the wireless network. The wireless coordinator device detects a change to the network topology or wireless connectivity of the wireless network, and analyzes the record to determine an event that caused the change to the network topology or wireless connectivity of the wireless network. The process continues by communicating a diagnostic notification that identifies the event.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
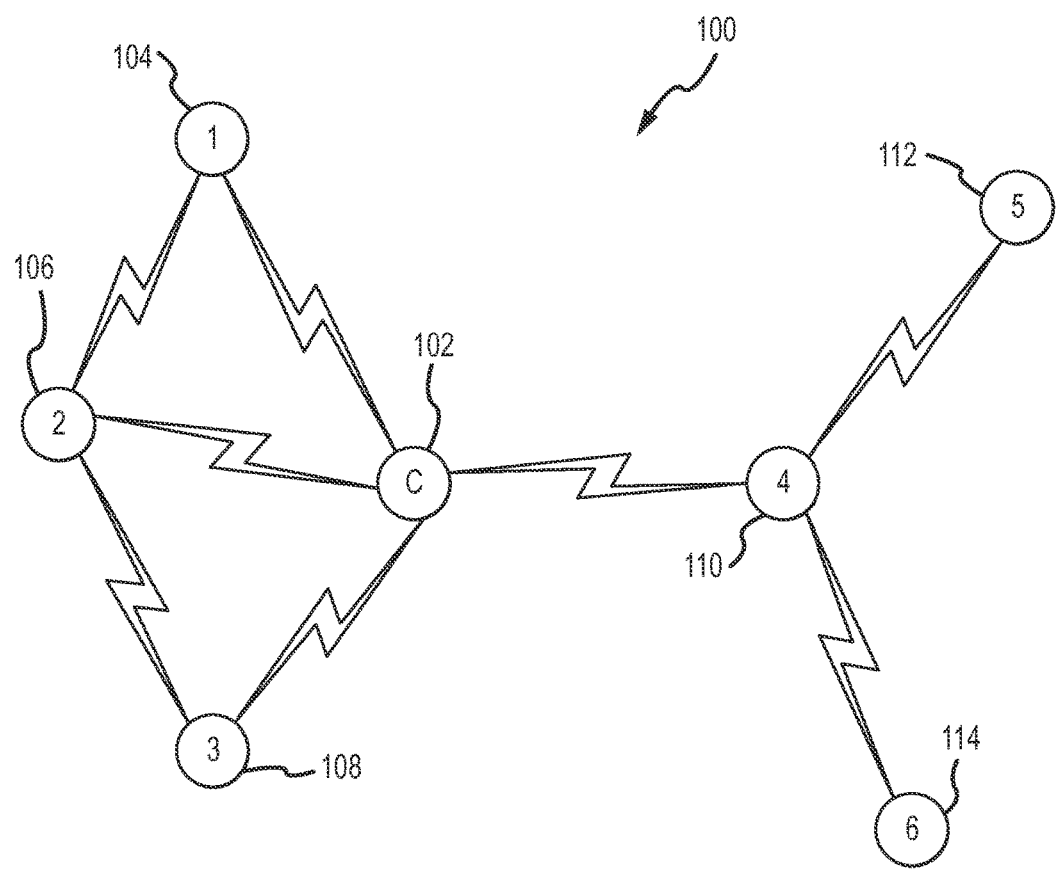
FIG. 1 is a diagram of a wireless network in a first topology.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, or the like, which may carry out a variety of functions under the control of one or more microprocessors or other control devices.

The subject matter presented here relates to certain monitoring and diagnostic techniques that can be deployed in connection with a network of wireless devices such as those found in a home automation system. Although the following description focuses on a home automation implementation, the techniques and technologies presented here can also be deployed in other wireless network applications. Moreover, the particular wireless networking protocols, specifications, and operating parameters may vary from one implementation to another, and the subject matter that is described in a generalized manner below can be modified or extended for use with a variety of different wireless network types. For example, the subject matter presented here can be utilized in conjunction with any of the following wireless network types, without limitation: ZigBee; IEEE 802.15; Z-Wave; wireless mesh network; wireless tree network; ad-hoc network; or the like.

In accordance with certain practical implementations of a home automation network, a coordinator device wirelessly communicates (directly or indirectly) with all of the end devices (e.g., control and sensor modules that correspond to the components that are to be controlled and monitored by the home automation system). Some end devices may also include wireless repeater or wireless router functionality that extends the range of the coordinator device. In this context, a repeater or router node in the wireless network can function as a data communication intermediary. A home automation control module that incorporates repeater/router functionality is desirable for cost savings and network simplicity.

A homeowner may reposition a repeater/router device with its associated component (e.g., a desk lamp) without appreciating the wireless connectivity implications of moving the device. Under certain conditions, movement of a repeater/router device will result in the loss of wireless connectivity with one or more control or sensor modules that were previously within wireless range of the repeater/router device. If no other devices are within range to compensate for the change in the network topology, then one or more components will no longer be controlled or monitored by the home automation system. Although it may be easy for the homeowner to observe the resulting loss of control (or connectivity), it may be difficult to identify the cause or otherwise troubleshoot the problem.

The system and methodology described here addresses the scenario mentioned above by dynamically monitoring and responding to changes in the wireless network topology. More specifically, the network coordinator device maintains a record of the network topology, the wireless connectivity of each device in the network, which devices are in range of each other, which devices have repeater/router functionality, and/or other network-related information. The network coordinator device can detect sudden changes in the network configuration and consult the record to determine a cause or an event that led to the change in the network configuration. For example, the coordinator device could determine whether a repeater/router device has been removed from the network and, if so, which wireless control modules (if any) have been affected by the removal. As another example, the coordinator device could analyze the updated network topology to determine that a repeater/router device has been moved in a way that has impacted the wireless connectivity of the network. In response to the detection of these and possibly other events, the coordinator device can generate and communicate a suitably formatted diagnostic notification to a user or a system administrator. The diagnostic notification may identify the problem, indicate an event that may have caused the problem, provide troubleshooting instructions or suggestions, or otherwise provide assistance to address the problem.

Referring now to the drawings, FIG. 1 is a diagram of a wireless network 100 in a first topology. In practice, a wireless network having the features described below may include any number of wireless nodes, one or more coordinator devices, zero to any number of wireless repeater devices, and zero to any number of wireless router devices. FIG. 1 depicts one simple embodiment for ease of illustration and description. It should be appreciated that different network configurations and topologies can be deployed if so desired.

The wireless network 100 illustrated in FIG. 1 includes a coordinator device 102 and six other wireless devices (identified by reference numbers 104, 106, 108, 110, 112, and 114). For this particular example, the six wireless devices represent control modules and/or monitoring devices in a home automation system. Thus, each of the six wireless devices can be coupled to one or more devices, components, systems, units, or equipment to be controlled and managed by the coordinator device 102. In certain embodiments, the coordinator device 102 also functions as a control module in the home automation system. Accordingly, the coordinator device 102 can be coupled to one or more devices, components, system, units, or equipment to be controlled. As described in more detail below, the coordinator device 102 may be realized as a video services receiver having conventional video presentation capabilities.

The wireless device 110 includes wireless repeater/router functionality. Accordingly, the wireless device 110 can extend the wireless range of the coordinator device 102. In this regard, the coordinator device 102 can wirelessly communicate with the wireless devices 112, 114 via the wireless device 110 even though the wireless range of the coordinator device 102 may be limited. FIG. 1 depicts this operating scenario: the coordinator device 102 does not have direct wireless connectivity with the wireless devices 112, 114. Instead, the coordinator device 102 relies on the wireless device 110, which has direct wireless connectivity with the coordinator device 102 and both wireless devices 112, 114.

For simplicity and ease of explanation, this description assumes that the other wireless devices 104, 106, 108, 112, 114 shown in FIG. 1 are "end devices" in that they do not include wireless repeater/router functionality.

Figure 2:
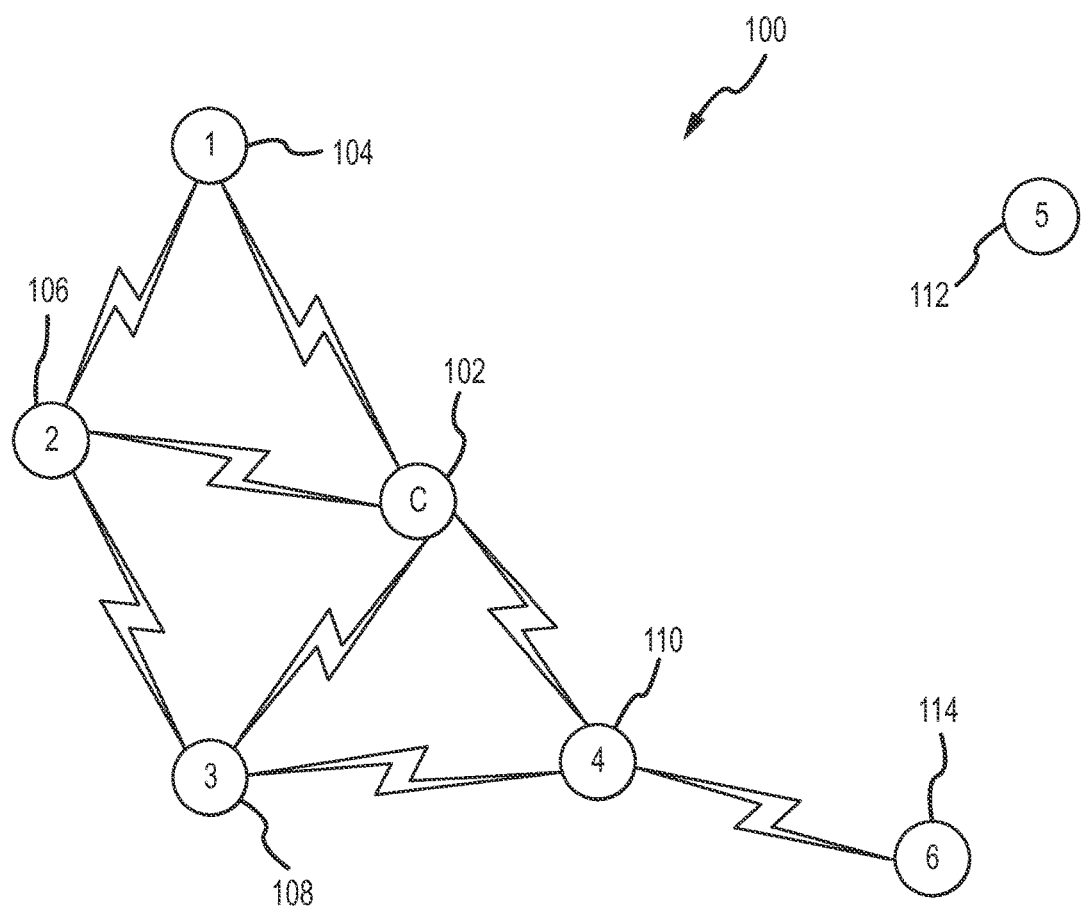
FIG. 2 is a diagram of a wireless network in a second topology.

FIG. 1 depicts the wireless network 100 in a topology that enables the coordinator device 102 to communicate (directly or indirectly) with all of the other wireless devices. As mentioned above, data communicated between the coordinator device 102 and the wireless devices 112, 114 must pass through the wireless device 110 as an intermediary device. In contrast, FIG. 2 is a diagram of the wireless network 100 in a second topology. More specifically, FIG. 2 depicts the wireless network 100 after the wireless device 110 has been relocated (the coordinator device 102 and the other wireless devices remain in their previous locations). The wireless device 110 has been moved such that it now supports direct wireless communication with the coordinator device 102, the wireless device 108, and the wireless device 114. Notably, however, the wireless device 110 has been moved such that the wireless device 112 is now out of range. Indeed, the wireless device 112 is now isolated in that it has no wireless connectivity with any other node in the wireless network 100. Thus, in the topology shown in FIG. 2, the coordinator device 102 is unable to communicate with the wireless device 112 (directly or indirectly).

The coordinator device 102 is suitably configured to detect changes in the network topology and react in an appropriate manner if a wireless device becomes disconnected. In certain embodiments, the coordinator device 102 generates and communicates a diagnostic notification that informs a user or a network administrator of the troublesome network status. Although the coordinator device 102 may be realized as a stand-alone networking component, certain preferred embodiments incorporate the functionality of the coordinator device 102 into an apparatus having additional features, e.g., an apparatus that is primarily designed for other purposes. For example, the coordinator device 102 could be integrated with an apparatus that can be controlled by a home automation system, such as an appliance, a television set, a video game console, a lamp, or the like. As another example, the coordinator device 102 can be realized as a video services receiver that primarily functions to receive video programming and present video content on a display element. Such integrated functionality allows the coordinator device 102 to take advantage of the audio/visual capabilities of the video services receiver when generating and providing diagnostic notifications related to the operation or status of the wireless network. Moreover, such integrated functionality allows the coordinator device 102 to leverage the display as a user interface for home automation functions.

Figure 3:
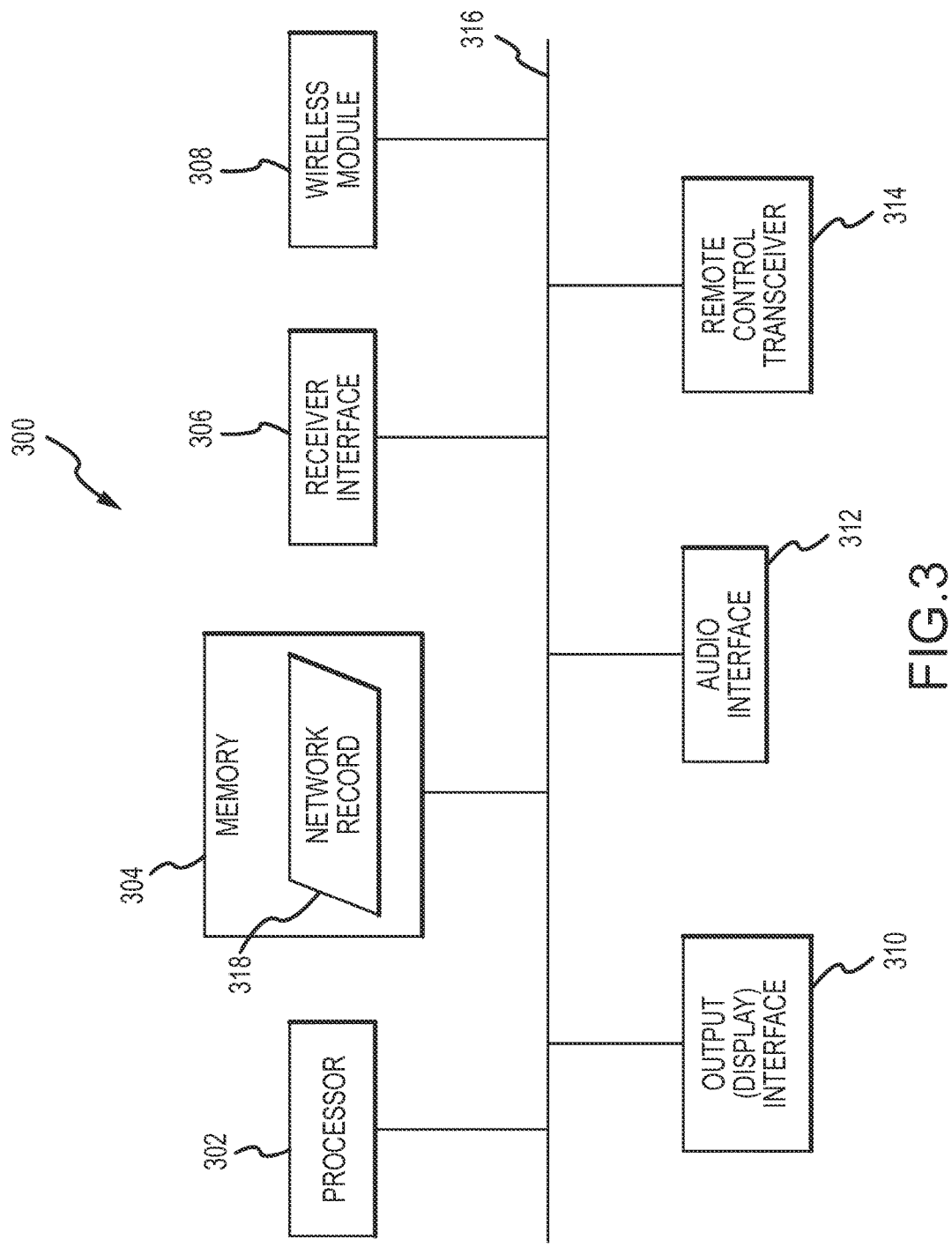
FIG. 3 is a schematic block diagram of an exemplary embodiment of a video services receiver that also serves as a wireless coordinator device for a wireless network.

FIG. 3 is a schematic block diagram of an exemplary embodiment of a video services receiver 300 that also serves as a wireless coordinator device for a wireless network. The video services receiver 300 is suitable for use in a content delivery system such as a cable television system or a satellite video system. The video services receiver 300 is designed and configured for providing audio and/or visual content to a user, and is further designed and configured to function as the coordinator device in a wireless network of the type described above. The video services receiver 300 may also support a variety of conventional multimedia, entertainment, computing, and/or communication functions (which will not be described in detail here).

The illustrated embodiment of the video services receiver 300 generally includes, without limitation: at least one processor 302; at least one memory element 304 having a suitable amount of memory associated therewith; a receiver interface 306; a wireless data communication module (hereinafter referred to as a wireless module 308); an output interface 310 such as a display interface for a display element; an audio interface 312; and a remote control transceiver 314. These components and elements may be coupled together as needed for purposes of interaction and communication using, for example, an appropriate interconnect arrangement or architecture 316. It should be appreciated that the video services receiver 300 represents an embodiment that supports various features described herein. In practice, an implementation of the video services receiver 300 need not support all of the enhanced features described here and, therefore, one or more of the elements depicted in FIG. 3 may be omitted from a practical embodiment. Moreover, a practical implementation of the video services receiver 300 will include additional elements and features that support conventional functions and operations.

The processor 302 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 302 may be realized as a microprocessor, a controller, a microcontroller, or a state machine. Moreover, the processor 302 may be implemented as a combination of computing devices, e.g., a combination of a digital signal processor and a microprocessor, a plurality of microprocessors, one or more microprocessors in conjunction with a digital signal processor core, or any other such configuration.

The memory element 304 may be realized using any number of devices, components, or modules, as appropriate to the embodiment. Moreover, the video services receiver 300 could include memory elements 304 integrated therein and/or memory elements 304 operatively coupled thereto, as appropriate to the particular embodiment. In practice, the memory element 304 can be realized as RAM memory, flash memory, EPROM memory, EEPROM memory, registers, a hard disk, a removable disk, or any other form of storage medium known in the art. In certain embodiments, the memory element 304 includes a hard disk, which may also be used to support integrated video recording functions of the video services receiver 300. The memory element 304 can be coupled to the processor 302 such that the processor 302 can read information from, and write information to, the memory element 304. In the alternative, the memory element 304 may be integral to the processor 302. As an example, the processor 302 and the memory element 304 may reside in a suitably designed ASIC.

As depicted in FIG. 3, the memory element 304 can be used to maintain and store at least one network record 318 that includes information related to the network topology, wireless connectivity status, network configuration, and/or other information regarding the current status of the wireless network of which the video services receiver 300 is a member. In this regard, the network record 318 may include a list of all wireless nodes in the network, including the video services receiver (acting as the coordinator device), wireless end nodes, wireless repeater devices, wireless router devices, etc. The network record 318 preferably includes a network identifier for each wireless node in the network, e.g., a MAC address or an equivalent code or string that uniquely identifies the particular node. The network record 318 may also include a name, label, nickname, or other user-specified tag that describes or identifies each wireless node. For example, the network record 318 may include fields or data objects that allow a user to identify wireless nodes with labels such as: controller; bedroom lamp 1; washing machine; porch light; living room ceiling fan; main television; and bedroom television. In certain embodiments, the network record 318 indicates which wireless devices have repeater or router functionality. Additionally or alternatively, the network record 318 can indicate which wireless devices are only capable of functioning as "end" devices, i.e., devices that do not include repeater/router features.

The network record 318 includes fields or data objects that indicate the current wireless network topology and/or the current wireless connectivity configuration of the network. For example, the network record 318 may include information that indicates whether or not a given wireless node is currently connected to other wireless nodes and, if so, which wireless nodes are connected thereto. Accordingly, for the topology depicted in FIG. 1, the network record 318 indicates that the coordinator device 102 has wireless connectivity with the wireless devices 104, 106, 108, 110. In addition, the network record 318 may indicate that the coordinator device 102 has indirect wireless access to the wireless devices 112, 114 via the wireless device 110. Similarly, the network record 318 may indicate that the wireless device 112 has only one direct wireless connection (with the wireless device 110).

The memory element 304 can be updated as often as needed to reflect changes in the network topology, wireless connectivity, and/or other status of the wireless network. In this way, the video services receiver 300 can dynamically react to changes in the wireless network in an immediate and ongoing manner. Moreover, the memory element 304 can store historical "snapshots" of the wireless network topology and configuration, such that the video services receiver 300 can intelligently diagnose problems and connectivity issues by comparing the current network state with the immediately previous state and/or with any previous state. Saving and analyzing historical network information can be useful to diagnose problems, generate troubleshooting instructions, and determine the cause of wireless connectivity issues.

The receiver interface 306 is suitably configured to receive and perform front end processing on signals received by the video services receiver 300. In this regard, the receiver interface 306 can receive data associated with any number of media content services, video services, content delivery channels, etc., including the actual content and data that is used to populate on-screen menus, GUIs, interactive programming interfaces, etc. The receiver interface 306 may leverage conventional design concepts that need not be described in detail here.

The wireless module 308 can include hardware, software, firmware, and processing logic as needed to support wireless communication of the type described here. The wireless module 308 can wirelessly communicate with a plurality of wireless devices arranged in a wireless network of the type described herein. Thus, the wireless module 308 may include a suitably configured wireless radio and at least one antenna element, which are operated in a conventional fashion to accommodate the transmitting and receiving of wireless data communication signals. In practice, the wireless module 308 can be designed and configured to support one or more wireless data communication protocols, as appropriate to the embodiment. To this end, any number of suitable wireless data communication protocols, techniques, or methodologies may be supported by the video services receiver 300, including, without limitation: RF; IrDA (infrared); Bluetooth; ZigBee (and other variants of the IEEE 802.15 protocol); Z-Wave; IEEE 802.11 (any variation); IEEE 802.16 (WiMAX or any other variation); Direct Sequence Spread Spectrum; Frequency Hopping Spread Spectrum; wireless hospital or health care facility network protocols such as those operating in the WMTS bands; GPRS; and proprietary wireless data communication protocols such as variants of Wireless USB.

The output interface 310 provides notifications for presentation on a device, system, or equipment that is coupled to the video services receiver 300. For this particular embodiment, the output interface 310 is operatively coupled to a display element (not shown) of the video services receiver 300, or is otherwise associated with one or more display elements that cooperate with the video services receiver 300. This enables the output interface to provide diagnostic notifications for rendering on the display element. Alternatively or additionally, the output interface 310 can be utilized to communicate a suitably formatted output (e.g., a diagnostic notification) to a compatible computer system, a mobile device, a printer, an alarm system, an indicator light, a messaging system (such as text messaging, email, or instant messaging), a telecommunication system, or the like. For the exemplary embodiment presented here, a display interface represents the hardware, software, firmware, and processing logic that is utilized to render graphics, images, video, and other visual indicia on the user's display. In this regard, the output interface 310 facilitates the presentation of content such as programs and notifications on the display(s) at the customer premises. For example, the output interface 310 is capable of supporting traditional functions of the video services receiver 300, along with features that relate to the network monitoring and diagnostic features described in more detail below with reference to FIG. 4.

The audio interface 312 is coupled to one or more audio system components (not shown) of the video services receiver 300 and/or to one or more audio system components that cooperate with the video services receiver 300. The audio interface 312 represents the hardware, software, firmware, and processing logic that is utilized to generate and provide audio signals associated with the operation of the video services receiver 300. Depending upon the particular embodiment, the audio interface 312 may be tangibly or wirelessly connected to the audio portion of a television or monitor device, or it may be tangibly or wirelessly connected to a sound system component that cooperates with the television or monitor device, or it may be integrated with the video services receiver 300.

The remote control transceiver 314 may be used in certain implementations of the video services receiver 300, such as a set-top box deployment. The remote control transceiver 314 performs wireless communication with one or more compatible remote devices, such as a remote control device, a portable computer, an appropriately equipped mobile telephone, or the like. The remote control transceiver 314 enables the user to remotely control various functions of the video services receiver 300, in accordance with well-known techniques and technologies. In certain embodiments, the remote control transceiver 314 is also used to navigate on-screen diagnostic notifications related to the status of the wireless network and/or to otherwise interact with displayed notifications generated by the video services receiver 300. Moreover, the remote control transceiver 314 can be used to support various features and functionality related to setup, control, monitoring, managing, etc.

Figure 4:
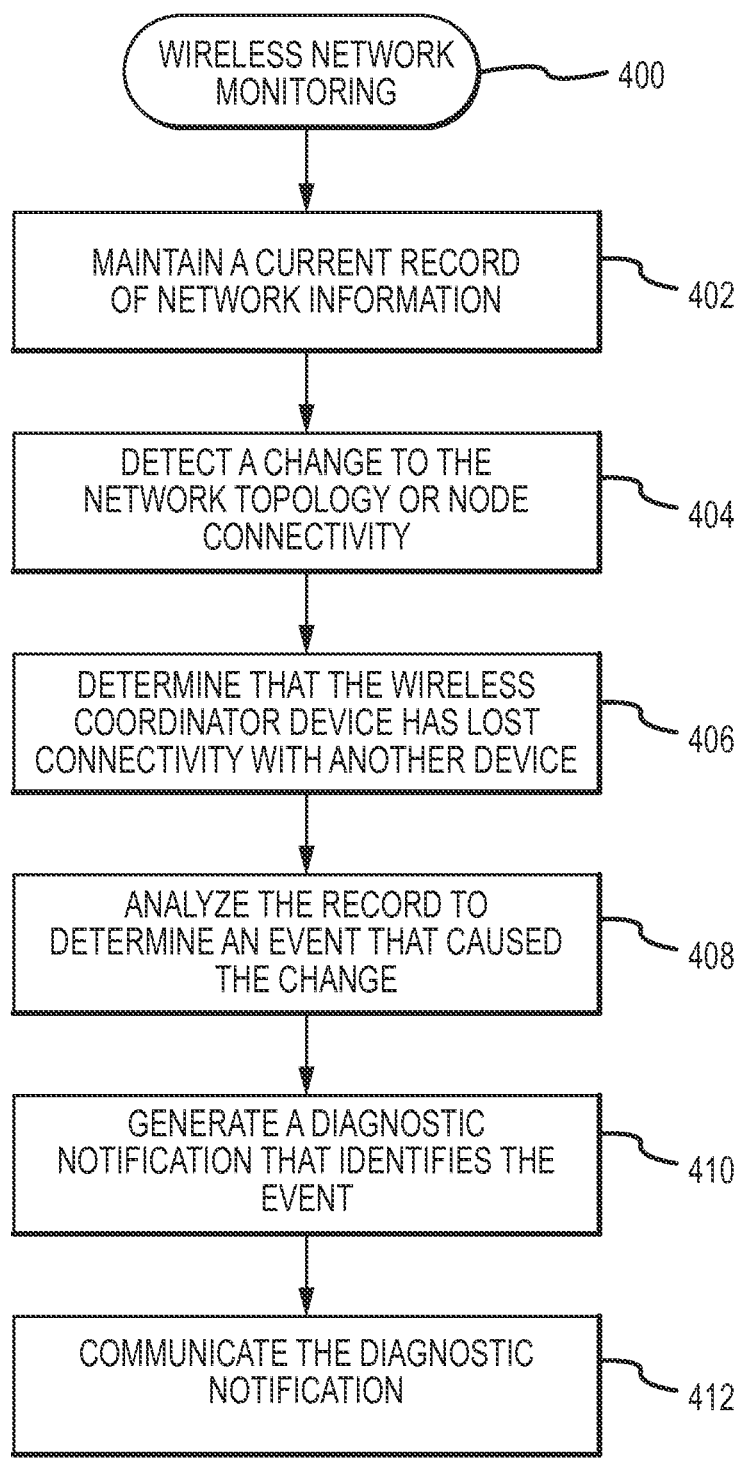
FIG. 4 is a flow chart that illustrates an exemplary embodiment of a wireless network monitoring process.

The video services receiver 300 (and other equipment that functions as a wireless coordinator device of a wireless network) can be utilized to monitor the wireless network status and to dynamically diagnose wireless connectivity problems as they occur in real time or substantially real time. The processor 302 cooperates with at least the memory element 304, the wireless module 308, and the output interface 310 to carry out certain processes related to the monitoring of the wireless network status. In this regard, FIG. 4 is a flow chart that illustrates an exemplary embodiment of a wireless network monitoring process 400, which can be performed by the video services receiver 300 (while functioning as a wireless coordinator device). The various tasks performed in connection with the process 400 may be performed by software, hardware, firmware, or any combination thereof. For illustrative purposes, the following description of the process 400 may refer to elements mentioned above in connection with FIGS. 1-3. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The embodiment of the process 400 described here maintains a record that includes information that is related to the network topology and/or wireless connectivity status of the wireless network (task 402). As mentioned above with reference to FIG. 3, the network record can be maintained in a memory element of a wireless coordinator device of the wireless network. Alternatively, the network record can be maintained in another data storage element that is accessible to the wireless coordinator device. The network record can be updated or refreshed as needed, e.g., according to a predefined schedule, whenever a change to the current network status occurs, in response to a user request or command, or the like. The information that forms the network record can be obtained or generated by the wireless coordinator device in any appropriate manner. For example, some of the information can be conveyed in wireless packets, overhead data, signaling data, wireless beacons, wireless pings, or the like. In accordance with certain implementations, each wireless packet received by the wireless coordinator device includes an identifier of the wireless node device from which the packet originated. In addition, each wireless packet can include an identifier of intermediary (repeater/router) wireless node devices that forwarded or routed the wireless packet. The wireless coordinator device can extract the received identifiers for purposes of updating the network record as needed.

The current network record represents a "snapshot" that describes the wireless network topology and interconnectivity of the various wireless nodes in the network. The current operating status and configuration of the wireless network may change over time, due to different events such as, without limitation: addition of a new wireless device; removal of a wireless device; a failure or error status of an existing wireless device; repositioning a wireless device; repositioning the wireless coordinator device; etc. Accordingly, the wireless coordinator device is suitably configured to detect a change to the network topology and/or a change to the wireless connectivity status of the wireless network (task 404). In practice, the wireless coordinator device can detect these changes by updating the network record and comparing it to the last (or any previous) network record. This enables the wireless coordinator device to detect that it has lost wireless connectivity with another wireless device in the network. As another example, the wireless coordinator device can consult the network record to detect that a wireless repeater/router device in the network has lost wireless connectivity with another wireless device in the network (as illustrated in FIG. 2). As yet another example, the change detected at task 404 may correspond to the removal, installation, or failure of a wireless device. Indeed, the change detected at task 404 may correspond to any event that results in a different network topology, wireless connectivity map, or the like.

This example assumes that the process 400 determines that the wireless coordinator device has lost connectivity—either direct wireless connectivity or indirect wireless connectivity—with another wireless device in the network (task 406). In response, the wireless coordinator device analyzes the network record(s) to determine or otherwise identify an event, condition, status, or activity that may have caused the change to the network topology or wireless connectivity of the network (task 408). In this context, the network record may contain some evidence that is indicative of a device failure, or evidence that suggests that a wireless device has been relocated such that it is now out of range. As another example, the network record may contain evidence that indicates that a new wireless repeater/router device has been introduced into the wireless network. The wireless coordinator device can be provided with a database or table of events that typically cause connectivity issues or network problems. Alternatively or additionally, the wireless coordinator device can include some self-learning intelligence that enables it to determine events that cause changes to the wireless connectivity of the network. As another example, the wireless coordinator device can access and consult an expert system or a database that is maintained by an outside service or entity in connection with task 408.

This example assumes that the process 400 identifies an event that may have caused the detected change in the wireless network. Accordingly, the process 400 continues by creating or otherwise generating a diagnostic notification that identifies the event (task 410). The diagnostic notification is provided or otherwise communicated for presentation to a user (task 412). For the video services receiver embodiment described above, the output interface 310 provides the diagnostic notification for presentation on a display element. In other embodiments, the diagnostic notification can be generated for delivery to a mobile device, a computer system, a printer, or any suitably configured device.

The diagnostic notification can identify the event that caused the change in the network, along with other information, instructions, suggestions, and the like. For example, the diagnostic notification can include an inquiry regarding whether a wireless repeater/router device has been moved relative to one or more wireless devices in the network (where movement of a repeater/router device might result in lost connectivity). As another example, the diagnostic notification can include an inquiry regarding whether a wireless device has been taken out of service, replaced, or repositioned. As yet another example, the diagnostic notification can include troubleshooting or problem-solving instructions related to reconfiguring the network topology. In this regard, the notification can provide suggestions to the user, such as: "Move Component A closer to Component B and test the system again"; "Did you move Component A recently?"; "Component A is no longer in the network. Did you remove it intentionally?"; "Component A is not detected. This has caused Components B and C to be disconnected"; and the like. The diagnostic notification can include information related to the current network status, operating condition, topology, and the like. For example, the notification can include a diagram of the current network topology, a list of wireless devices that are in communication with the coordinator device, a table or other data structure that indicates the different wireless communication paths throughout the network, network status data, network performance data, etc.

The diagnostic notification serves as an alert to the user, and provides information that might otherwise be unavailable or difficult to obtain. The methodology described here is particularly suited for use in a home automation system that relies on wireless control modules. That said, the methodology described here can also be utilized in other wireless network environments, and various applications and uses are contemplated by this disclosure.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An apparatus comprising:
a wireless data communication module to wirelessly communicate with a plurality of wireless devices arranged in a wireless network;
an output interface to provide notifications for presentation on a device coupled to the apparatus;
a memory element to store network records that include information related to network topology, wireless connectivity, and network configuration regarding historical status of the wireless network; and
a processor coupled to the wireless communication module and to the output interface, wherein the processor detects a change to a network topology or wireless connectivity of the wireless network by comparing a currently updated network record to a previous network record stored in the memory element, determines an event that caused the change to the network topology or wireless connectivity of the wireless network, and creates a diagnostic notification that identifies the event, the output interface providing the diagnostic notification for presentation on the device, wherein the processor further detects when the apparatus has changed or lost wireless connectivity with one of the plurality of devices, in a first instance by operably accessing within a service of the wireless network, a database or table of events that typically cause such a change or a loss of wireless connectivity and additionally using self-learning intelligence techniques for determining events that may cause the change or the loss of the wireless connectivity, and in a second instance by operably accessing outside the service of the wireless network, a database or expert system maintained for the cause or for consult of the cause and events related to the change or loss of the wireless connectivity.

2. The apparatus of claim 1, wherein:
the apparatus comprises a video services receiver;
the video services receiver is operatively coupled to a display element; and
the output interface provides the diagnostic notification for rendering on the display element.

3. The apparatus of claim 1, wherein:
the plurality of wireless devices comprises a wireless router device; and
the processor detects that the wireless router device has lost wireless connectivity with one of the plurality of wireless devices.

4. The apparatus of claim 3, wherein:
the diagnostic notification comprises an inquiry regarding whether the wireless router device has been moved relative to the one of the plurality of wireless devices.

5. The apparatus of claim 1, wherein:
the plurality of wireless devices comprises a wireless repeater device; and
the processor detects that the wireless router device has lost wireless connectivity with one of the plurality of wireless devices.

6. The apparatus of claim 5, wherein:
the diagnostic notification comprises an inquiry regarding whether the wireless repeater device has been moved relative to the one of the plurality of wireless devices.

7. The process of claim 1, wherein:
the diagnostic notification comprises troubleshooting instructions related to reconfiguring the network topology.

8. An apparatus comprising:
a receiver interface to receive data associated with video services;
a wireless data communication module to wirelessly communicate with a plurality of wireless devices arranged in a local network;
a display interface for a display element operatively coupled to the apparatus, the display interface facilitating presentation of content on the display, the content including video content provided by the video services;
a memory element to store network records that include information related to network topology, wireless connectivity, and network configuration regarding historical status of the wireless network; and
a processor coupled to the receiver interface and the display interface, wherein the processor detects a change to a network topology or wireless connectivity of the local network by comparing a currently updated network record to a previous network record stored in the memory element, determines an event that caused the change to the network topology or wireless connectivity of the local network, and creates a diagnostic notification that identifies the event, the display interface providing the diagnostic notification for rendering on the display element, wherein the processor further detects when the apparatus has changed or lost wireless connectivity with one of the plurality of devices using self-learning intelligence techniques for determining events that may cause the change or the loss of the wireless connectivity wherein the self-learning intelligence techniques comprise: operably accessing outside the service of the wireless network, a database or expert system maintained for the cause or for consult of the cause and events related to the change or loss of the wireless connectivity.

9. The apparatus of claim 8, wherein:
the plurality of wireless devices comprises a wireless router device; and
the processor detects that the wireless router device has lost wireless connectivity with one of the plurality of wireless devices.

10. The apparatus of claim 8, wherein:
the plurality of wireless devices comprises a wireless repeater device; and
the processor detects that the wireless router device has lost wireless connectivity with one of the plurality of wireless devices.

11. The apparatus of claim 8, wherein:
the diagnostic notification comprises troubleshooting instructions related to reconfiguring the network topology.

12. A process comprising:
maintaining, with a wireless coordinator device of a wireless network that includes a plurality of wireless devices, a previous network record that includes information related to a current network topology and wireless connectivity of the wireless network;
detecting, with the wireless coordinator device, a change to the network topology or wireless connectivity of the wireless network by comparing an updated network record to the previous network record stored in the memory element;
analyzing, with the wireless coordinator device, the record to determine an event that caused the change to the network topology or wireless connectivity of the wireless network; and
communicating a diagnostic notification that identifies the event, wherein the wireless coordinator device further comprises: detecting, when the apparatus has changed or lost wireless connectivity with one of the plurality of devices using self-learning intelligence techniques for determining events that may cause the change or the loss of the wireless connectivity wherein the self-learning intelligence techniques comprise: accessing an expert system maintained by an outside service for the cause or for consult of the cause and events related to the change or loss of the wireless connectivity.

13. The process of claim 12, wherein:
the wireless coordinator device comprises a video services receiver;
the video services receiver is operatively coupled to a display element; and
the diagnostic notification is generated by the video services receiver for rendering on the display element.

14. The process of claim 12, wherein:
the plurality of wireless devices comprises a wireless router device; and
the detecting comprises determining that the wireless router device has lost wireless connectivity with one of the plurality of wireless devices.

15. The process of claim 14, wherein:
the diagnostic notification comprises an inquiry regarding whether the wireless router device has been moved relative to the one of the plurality of wireless devices.

16. The process of claim 12, wherein:
the plurality of wireless devices comprises a wireless repeater device; and
the detecting comprises determining that the wireless router device has lost wireless connectivity with one of the plurality of wireless devices.

17. The process of claim 16, wherein:
the diagnostic notification comprises an inquiry regarding whether the wireless repeater device has been moved relative to the one of the plurality of wireless devices.

18. The process of claim 12, wherein:
the diagnostic notification comprises troubleshooting instructions related to reconfiguring the network topology.

* * * * *